US012326948B2

(12) United States Patent
Peddibhotla et al.

(10) Patent No.: US 12,326,948 B2
(45) Date of Patent: Jun. 10, 2025

(54) IDENTITY TIME MACHINE

(71) Applicant: Ping Identity International. Inc., Denver, CO (US)

(72) Inventors: Sudhakar Peddibhotla, San Francisco, CA (US); Sandesh More, San Francisco, CA (US); Peter Barker, Austin, TX (US)

(73) Assignee: Ping Identity International, Inc., Denver, CO (US)

( * ) Notice: Subject to any disclaimer, the term of this patent is extended or adjusted under 35 U.S.C. 154(b) by 377 days.

(21) Appl. No.: 17/506,516

(22) Filed: Oct. 20, 2021

(65) Prior Publication Data
US 2023/0117846 A1 Apr. 20, 2023

(51) Int. Cl.
*G06F 16/21* (2019.01)
*G06F 21/62* (2013.01)

(52) U.S. Cl.
CPC ........ *G06F 21/6218* (2013.01); *G06F 16/219* (2019.01); *G06F 2221/2101* (2013.01); *G06F 2221/2141* (2013.01)

(58) Field of Classification Search
CPC .............. G06F 21/6218; G06F 16/219; G06F 2221/2101; G06F 2221/2141; G06F 16/21
See application file for complete search history.

(56) References Cited

U.S. PATENT DOCUMENTS

| 2013/0124500 | A1* | 5/2013 | Beavin | G06F 16/24534 707/E17.017 |
| 2016/0180113 | A1* | 6/2016 | Patton | G06F 16/9535 726/28 |
| 2018/0189334 | A1* | 7/2018 | Cong | G06F 16/94 |
| 2021/0297387 | A1* | 9/2021 | Tobias | G16H 10/60 |

OTHER PUBLICATIONS

Forgerock, Inc.. Maximize the Value of Your Identity Solution with AI-Driven Identity Analytics, 2020, 10 pgs.

* cited by examiner

*Primary Examiner* — Kaveh Abrishamkar
*Assistant Examiner* — Howard H. Louie

(57) ABSTRACT

The disclosed technology teaches a computer-implemented method of enabling identity governance administration to examine the state of identity management objects at an arbitrary prior time. The method includes maintaining a data store of identity management objects used for identity governance administration, including specification of user roles from which permissions or authorizations derive and recording in the data store copies of identity management objects with an as-of time stamp at each creation, change and deletion of each identity management object. Also included is retaining time-stamped versions of the objects for a queryable time window. The method also includes receiving a query with an as-of time criteria for at least some of the identity management objects and returning responsive objects from which the permissions or authorizations were derived at the as-of-time. Responding to the query with the responsive objects that correspond to the as-of time criteria in the query is also disclosed.

21 Claims, 9 Drawing Sheets

```
POST /timemachine/_doc 612
{
    "name" : "Sudhakar",
    "created" : "2020-03-01T00:00:00.001Z"
}

POST /timemachine/_doc 632
{
    "name" : "Sudhakar",
    "department" : "Autonomous Engineering",
    "created" : "2020-04-01T00:00:00.001Z"
}

POST /timemachine/_doc 652
{
    "name" : "Sudhakar",
    "department" : "Autonomous Engineering",
    "costCenter" : "AUTO",
    "created" : "2020-05-01T00:00:00.001Z"
}

POST /timemachine/_doc 662
{
    "name" : "Sudhakar",
    "department" : "Autonomous Engineering",
    "costCenter" : "AUTO-001",
    "created" : "2020-06-01T00:00:00.001Z"
}

POST /timemachine/_doc 672
{
    "name" : "Sudhakar",
    "department" : "Autonomous Engineering",
    "costCenter" : "AUTO-002",
    "created" : "2020-07-01T00:00:00.001Z"
}

POST /timemachine/_doc 616
{
    "name" : "Jamie",
    "department" : "Core Identity",
    "costCenter" : "Core Identity",
    "created" : "2010-05-01T00:00:00.001Z"
}

POST /timemachine/_search 636
{
    "query": {
        "bool": {
            "must": [{
                "range": {
                    "created": {
                        "lte": "2020-06-03T00:00:00.000Z"
                    }
                }
            }]
        }
    },
    "collapse": {
        "field": "name.keyword"
    },
    "sort": [
        {
            "created" : "desc"
        }
    ]
}
```

FIG. 6

IDENTITY TIME MACHINE

INCORPORATIONS

The following materials are incorporated by reference in this filing:

U.S. Application Ser. No. 16/579,740, titled "Secure Service Isolation Between Instances of Cloud Products Using a SaaS Model", filed 23 Sep. 2019, now U.S. Pat. No. 10,817,346 on 27 Oct. 2020.

U.S. application Ser. No. 17/068,653, titled "Secure Service Isolation Between Instances of Cloud Products Using a SaaS Model", filed 12 Oct. 2020.

FIELD OF THE TECHNOLOGY DISCLOSED

The technology disclosed relates generally to identity governance and administration for enterprises providing services to customers, both in the cloud and for on-premises systems, for ensuring that the right users have the appropriate access to technology resources. Specifically, the disclosed technology relates to providing identity and history of access, for improving centralized orchestration of identity management and access control.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

With the size, number and frequency of data breaches increasing year over year, the pressures caused by external security threats continue to grow. A need exists for secure authentication and authorization for customers who utilize cloud-based services, even as challenges and requirements expand with an increasing number of identities, volume of activities requiring access, and uptick in remote working.

Key issues that customers are trying to solve are the handling of identity, entitlement and role provisioning/deprovisioning when users join their organization, move within the organization or leave the organization. Legacy identity and access management and governance administration solutions are ill equipped to handle these challenges and requirements.

Most access management systems operate in similar ways. A core purpose of an access management system is to support a single sign-on authentication scheme that allows a user to log in with a single ID and password to any of several related, yet independent, software systems and to do so in a manner that is risk aware. These single sign-on systems are built to be highly available, fault tolerant and performant. However, the ability to access and examine the history of access is not central to access management. To provide identity and access service for customers who care about history, existing approaches utilize security information and event management (SIEM) technology and other such solutions typically for the collection and analysis of both near real time and historical security events.

The provisioning solutions of the past were not created with visibility, ease of audit and compliance in mind. As regulation of user's access has become a major compliance problem, customers have resorted to audit logs and they spend enormous effort and resources to chase down the information that proves compliance with security policies and regulations.

An opportunity arises to enable identity governance administration for examining the state of identity management objects at any arbitrary prior time. The disclosed technology can empower an efficient workforce, protect the organization, and help achieve regulatory compliance.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4 shows an example of time machine entries stored for two times, for a user and a user's account access.

FIG. 5 shows an example of time machine entries stored for user Bob for three times, added at times after user Bob is created in the system.

FIG. 6 lists a query example that illustrates a single-entity time-based query, usable for explaining how the disclosed system for examining the state of identity management objects at an arbitrary prior time works.

DETAILED DESCRIPTION

Figure 1:
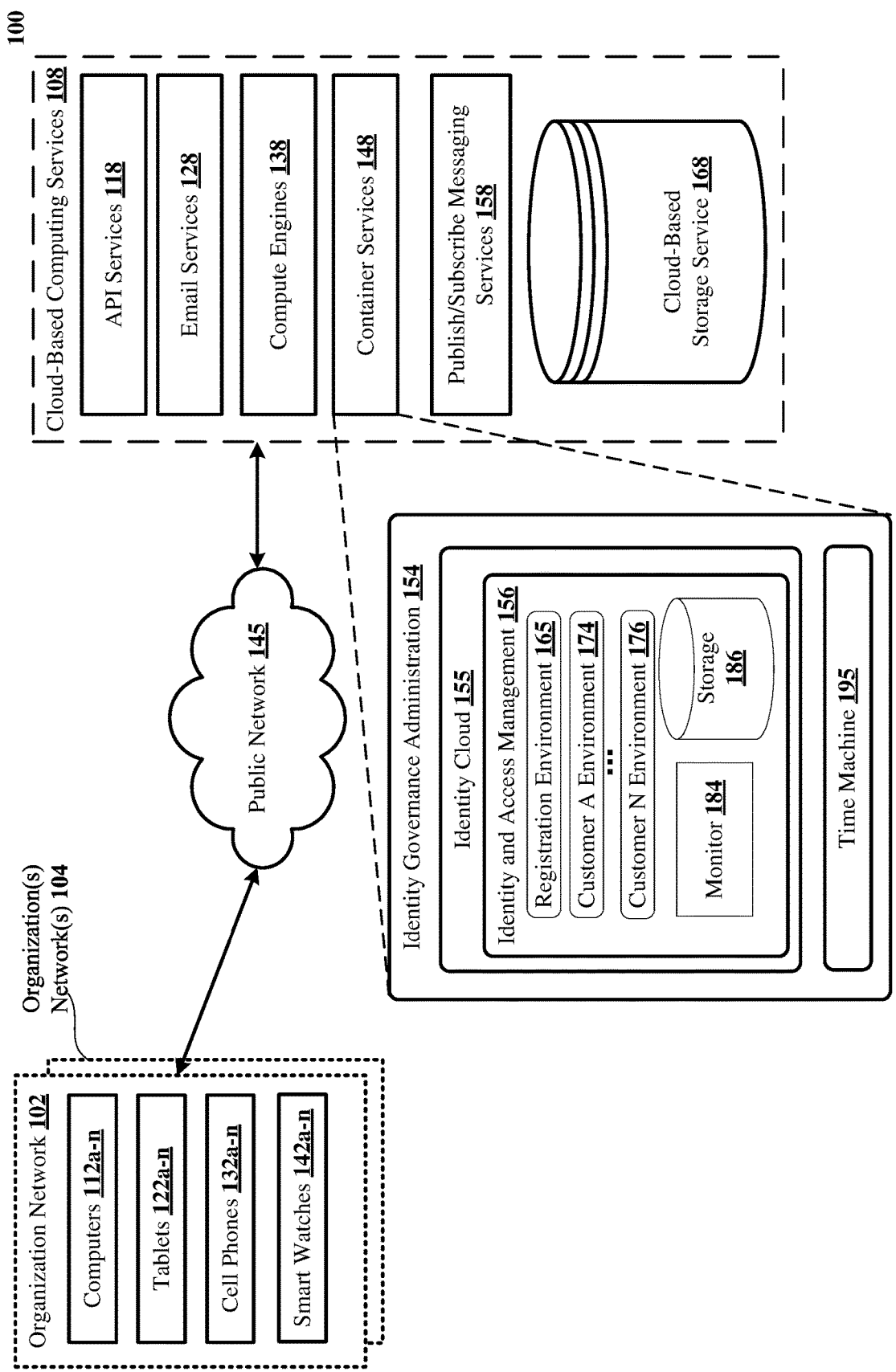
FIG. 1 shows an architectural level schematic of a system for enabling identity governance administration to examine the state of identity management objects at any arbitrary prior time, according to one embodiment of the disclosed technology.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

With the size, number, and frequency of data breaches increasing year over year, pressures caused by external security threats continue to grow. Meanwhile, the number of identities and volume of activities requiring access, compounded by the uptick in remote working, are expanding at a rapid cadence.

As external and insider cyberthreats become a bigger challenge, the scope of identity management has grown in response. These threats make securing identities and access more important than ever before. As a result, the regulatory and compliance landscape is becoming ever more complex and rigorous, with a multitude of regulations, such as Sarbanes-Oxley (SOX), Health Insurance Portability and Accountability Act (HIPAA), General Data Protection Regulation (GDPR), Federal Information Security Management Act (FISMA), and others. Legacy identity and access management (IAM) and identity governance and administration (IGA) solutions (a subset of IAM) are not equipped to handle these growing challenges and requirements at scale.

To effectively mitigate risk and protect organizational data, organizations need a comprehensive view of all user access. Whether on-premises or cloud-based, legacy identity solutions are siloed and likely do not connect to all business applications. The result is a lack of enterprise-wide user access visibility, awareness of high-risk activity, and the inability to recommend appropriate access privileges, like entitlement and role assignments. With no contextual perspective, organizations end up with siloed visibility of rapidly growing identity populations (for example, employees, contractors, partners, and consumers). The problem is amplified when information is spread across both on-premises and cloud-based environments.

This context is particularly critical for maintaining compliance in a complex regulatory landscape. Security and compliance teams are required to manage and govern identity and access by those standards, but it's incredibly challenging to be compliant without complete visibility. An effective solution would provide context of who has access to which applications, how they obtained that access, and what they're doing with that access.

The disclosed technology for autonomous identity governance administration safeguards history data and makes the historical access data available. Identity management events capture authentication and authorization for users, accounts, entitlements, applications and roles. The disclosed technology captures and stores each identity management event with an as-of time stamp. These stored events tell the story of what access and permissions are in force at any arbitrary point in time. Because no identity management objects are lost, an analyst can reconstruct the history of access permissions and authorizations.

The disclosed technology offers identity governance administration in the cloud, for examining the state of identity management objects at an arbitrary prior time. The disclosed technology for an identity time machine stores identity governance related events in a time aware data storage, so that a record is available for any event that has occurred since the machine was provisioned. The event storage is continually processed, so that events leading up to the present are available for real-time query. For identity management, an analyst could wind-back-in-time and review access as of a certain date. For example, an analyst could go back to March of the previous year and review the access available for a user or app at that time. Past access management behavior of the user can be queried in near real time to construct various heuristics-based risk assessment reporting. Especially in the Identity Cloud, in which both identity management and access management are part of the same solution, the disclosed identity time machine can allow customers to analyze user profiles associated with actual access history and vice versa, in which certification could benefit by access to reports of actual past access history.

The disclosed identity time machine enables the examination of the history of permissions and authorizations, to addresses stringent regulations for privacy and consent, including General Data Protection Regulation (GDPR), Health Insurance Portability and Accountability Act of 1996 (HIPAA), Open Banking, etc. In one example at Sarbanes Oxley, access to key apps are reviewed by supervisors as well as by key control owners, to affirm that specific users need to continue to have access, and this review process is supported by a full set of permission and authorization records.

The next section describes an architecture for enabling identity governance administration to examine the state of identity management objects at an arbitrary prior time.

Architecture

FIG. 1 shows an architectural level schematic of a system 100 for enabling identity governance administration to examine the state of identity management objects at an arbitrary prior time. Because FIG. 1 is an architectural diagram, certain details are intentionally omitted to improve clarity of the description. The discussion of FIG. 1 is organized as follows. First, the elements of the figure are described, followed by their interconnections. Then, the use of the elements in the system are described in greater detail.

System 100 includes organization network 102, identity cloud 155 with cloud-based computing services 108 and public network 145. System 100 can include multiple organization networks 104 for multiple organizations. Identity governance administration 154 includes time machine 195, as well as identity cloud 155 which includes customer environments hosted on behalf of specific customers. Each customer's environment interacts with an organization network 102. Organization network 102 includes computers 112a-n, tablets 122a-n, cell phones 132a-n and smart watches 142a-n. In another organization network, organization users may utilize additional devices. Cloud-based computing services 108 includes API services 118, web email services 128, compute engines 138, container services 148 and publish/subscribe messaging services 158 which support event-driven, asynchronous communication among decoupled applications, such as microservices and serverless architectures. Also includes is cloud-based storage service 168. Cloud-based computing services 108 can include additional apps and services as well. Identity cloud 155 connects to organization network 102 and cloud-based computing services 108 via public network 145. Time machine 195 is described in more detail below, relative to FIG. 3.

Identity governance administration 154, implemented using container services 148 as indicated via the dotted lines, is a multi-tenant service for customer identity and access management 156 that includes pre-configuration for building rich applications with integrated and secure registration, account recovery, and modern multifactor authentication in one embodiment. Identity and access management cloud services includes registration environment 165 for registering new users and creating new customer environments and managing the overall health of the services, and also includes customer A environment 174 through customer N environment 176. Multiple different customers can have environments within a single identity cloud 155. In another implementation, the setup can be different. Customer data is stored within the customer environment. It is not co-mingled with other customers' data and can be accessed only by the customer. Identity cloud 155 utilizes a suite of cloud computing services, alongside a set of management tools, that provides a series of modular cloud services including computing, data storage and data analytics. In one case, identity cloud 155 is implemented using Google Cloud Platform (GCP) that provides infrastructure as a service, platform as a service, and serverless computing environments. GCP Platform is a part of Google Cloud, which includes the GCP public cloud infrastructure, as well as G Suite, enterprise versions of Android and Chrome OS, and application programming interfaces (APIs) for machine learning and enterprise mapping services. At the physical level, GCP provides encryption of data at rest. Data is encrypted when written to a hard drive and decrypted when read. In other cases, identity governance administration 154 could be implemented using Amazon Web Services (AWS) or Microsoft Azure Virtual Machines. While it is understood that, identity governance administration 154 could be implemented via an AWS or Azure VM platform, the following description of the disclosed technology utilizes a GCP cloud-based computing cluster for an identity management instance using a SaaS model.

Continuing further with the description of FIG. 1, system 100 can be used in the delivery of many kinds of services as cloud-based computing services 108: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data. A network service or application can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™, Box™, Dropbox™, Google Apps™, Amazon AWS™, Microsoft Office 365™, Workday™, Oracle on Demand™ Taleo™, Yammer™ Jive™ and Concur™.

In the interconnection of the elements of system 100, public network 145 couples computers 112*a-n*, tablets 122*a-n*, cell phones 132*a-n*, smart watches 142*a-n*, API services 118, email services 128, compute engines 138, container services 148 with, identity governance administration 154, publish/subscribe messaging services 158 and cloud-based storage service 168 in communication. The communication path can be point-to-point over public and/or private networks. Communication can occur over a variety of networks, e.g., private networks, VPN, MPLS circuit, or Internet, and can use appropriate application program interfaces (APIs) and data interchange formats, e.g. REST, JSON, XML, SOAP and/or JMS. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, identity cloud 155 includes monitor 184 and storage 186 which can include one or more computers and computer systems coupled in communication with one another. Customer environments can emit health related data to monitor 184 and storage 186. They can also be one or more virtual computing and/or storage resources. Monitor 184 can be utilized to determine availability of customer environments and can include infrastructure level monitoring and basic application-level metrics, as well as configuration controls for organization administrators of customers. For example, monitor 184 can utilize one or more Google Compute engines or Amazon EC2 instances and storage 186 can be Google Cloud Platform datastore or Amazon S3™ storage. The engines or system components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection. For example, organization network 102 can be coupled via network(s) 145 (e.g., the Internet), identity governance administration 154 can be coupled via a direct network link and cloud-based computing services 108 can be coupled by yet a different network connection.

Storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud-based computing services 108. Non-structured data, such as free text, can also be provided by, and targeted back to cloud-based computing services 108. Both structured and non-structured data are capable of being aggregated by identity cloud 155. For instance, assembled metadata can be stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects can be stored in a schema-less or NoSQL key-value metadata store like Apache Cassandra™, Google's BigTable™, HBase™, Voldemort™, CouchDB™, MongoDB™, Redis™, Riak™, Neo4j™, etc.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™ and Yahoo! S4™.

Figure 2:
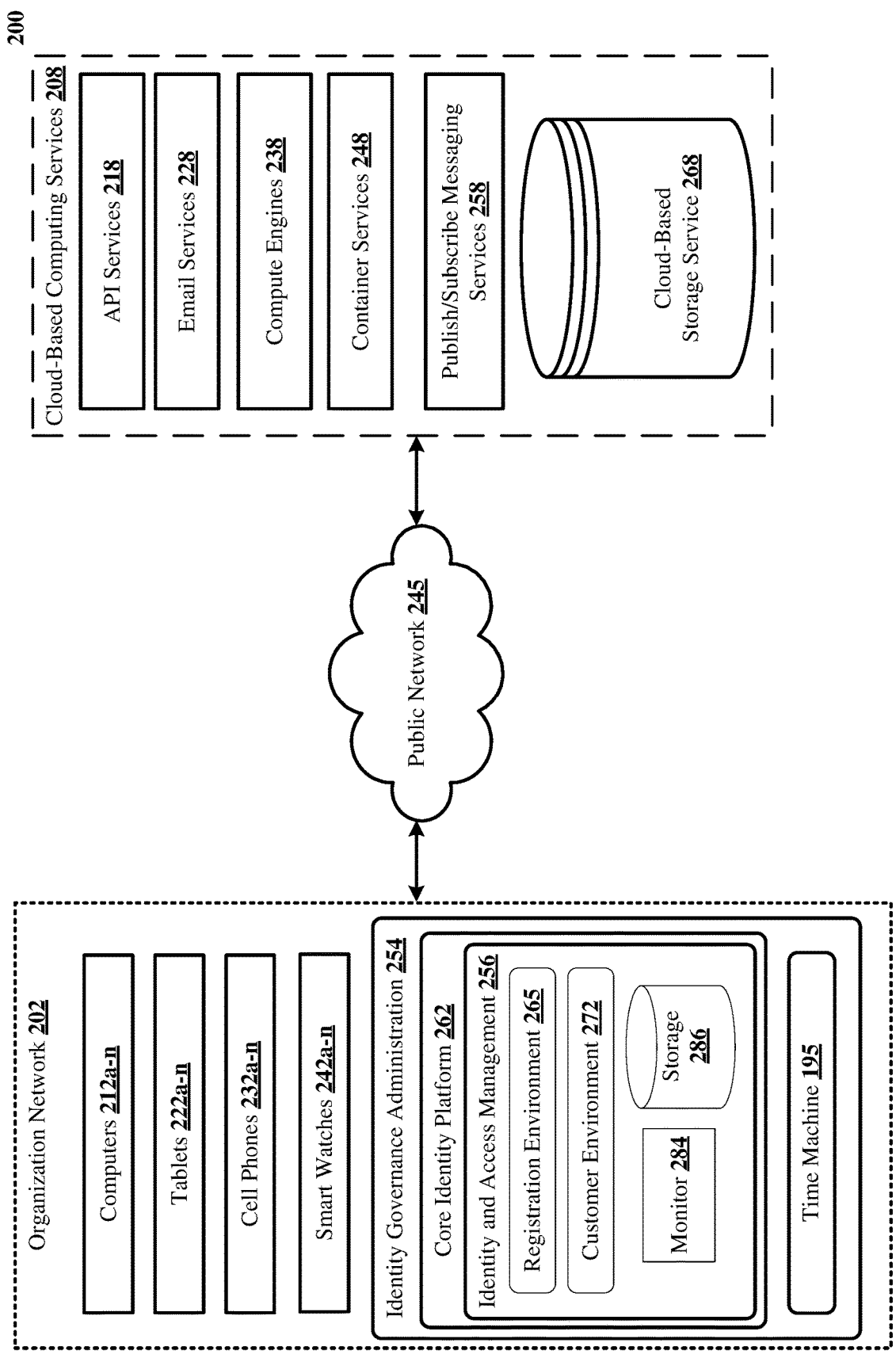
FIG. 2 shows an architectural level schematic of an on-premises system for enabling identity governance administration to examine the state of identity management objects at an arbitrary prior time, according to one embodiment of the disclosed technology.

FIG. 2 shows an architectural level schematic of a system 200 for enabling identity governance administration, on premises, to examine the state of identity management objects at an arbitrary prior time. System 200 includes organization network 202, cloud-based computing services 108 and public network 145. Organization network 202 includes identity governance administration 154 which includes core identity platform 262 as well as time machine 195. Core identity platform 262, with customer identity and access management 256, includes pre-configuration for building rich applications with integrated and secure registration, account recovery, and modern multifactor authentication in one embodiment. Identity and access management cloud services has registration environment 265 for registering new users of the organization network and managing the overall health of the services, and also includes customer environment 272 and storage 286. Core identity platform 262 utilizes monitor 284 to determine availability of a customer environment and can include infrastructure level monitoring and basic application-level metrics, as well as configuration controls for organization administrators. Storage 286 can include one or more computers and computer systems coupled in communication with one another. In another implementation, the setup can be different. Customer data is stored within the customer environment. It is not co-mingled with other customers' data and can be accessed only by the customer. Core identity platform 262 can utilize a suite of computing services, alongside a set of management tools, that provides a series of modular services including computing, data storage and data analytics. Time machine 195 is described in more detail below, relative to FIG. 3.

Continuing the description of system 200, customer environment 272 is hosted on premises by the organization. Organization network 202 includes computers 212a-n, tablets 222a-n, cell phones 232a-n and smart watches 242a-n. In another organization network, organization users may utilize additional devices. Cloud-based computing services 208 includes API services 218, web email services 228, compute engines 238, container services 248 and publish/subscribe messaging services 258 which support event-driven, asynchronous communication among decoupled applications, such as microservices and serverless architectures. Also included is cloud-based storage service 268. Cloud-based computing services 208 can include additional apps and services as well. Core identity platform 262 connects to cloud-based computing services 208 via public network 145.

Figure 3:
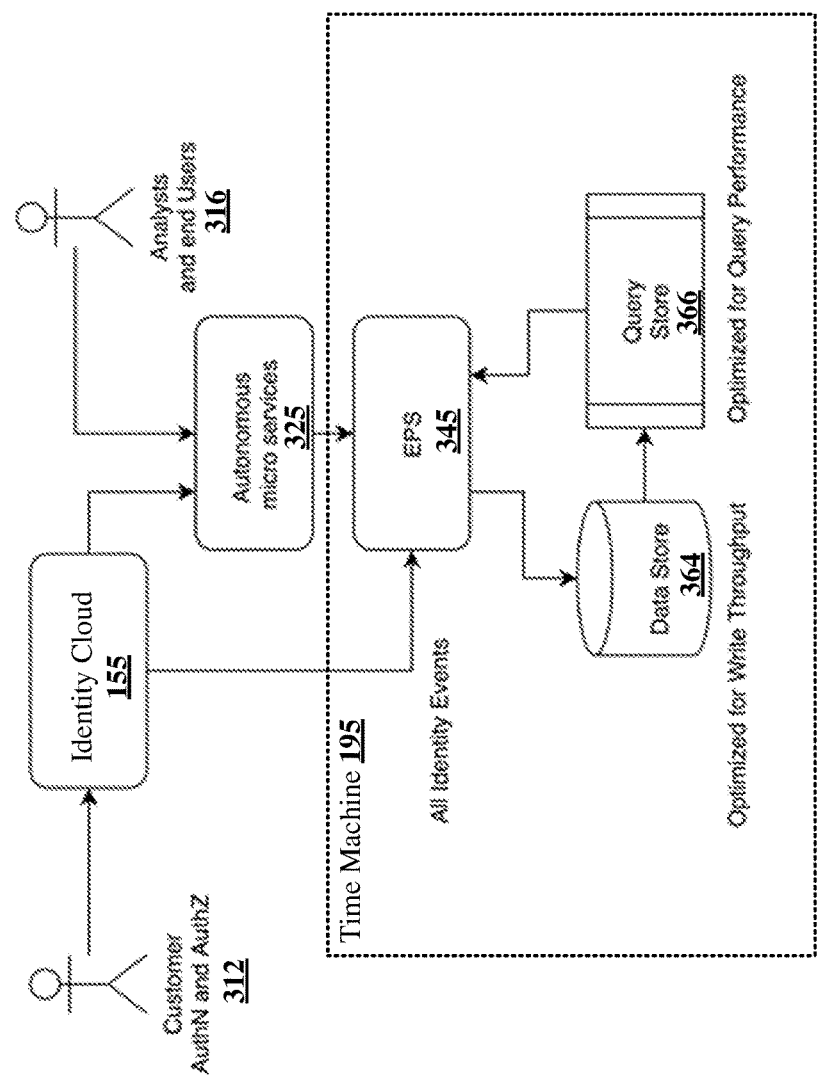
FIG. 3 shows a simplified block diagram of time machine, with identity cloud, for enabling identity governance administration to examine the state of identity management objects at an arbitrary prior time.

FIG. 3 shows a simplified block diagram 300 of time machine 195 and identity cloud 155, for enabling identity governance administration to examine the state of identity management objects at an arbitrary prior time. Customer 312 completes the authorization and authentication processes using identity cloud 155, which results in the generation of identity management events. Autonomous micro services 325 receives and handles identity information for authenticating and authorizing customer 312. Identity cloud 155 sends the identity events to Elastic Persistence and Search (EPS) search engine 345, which stores the events in horizontally scalable and high write throughput data store 364. To support real-time queries, EPS search engine 345 continually processes and fans out the data into various small indices, utilizing Elastic search. In one example, data store 364 is implemented using Cassandra; in another example Mongo is used for the implementation of data store 364. Additional scalable storage, such as AWS Simple Cloud Storage (S3), Google Cloud Storage (GCS) an BigQuery can be utilized for other implementations. Data store 364 can transfer event data optimized for query performance to query store 366, which can respond to queries to EPS search engine 345 that are requested by analysts and end users 316. In one example in which a disclosed auditable identity warehouse captures every mutation, as described below, a single bank customer may store ten terabytes of event data for enabling identity governance administration to examine the state of identity management objects at an arbitrary prior time, over the course of a decade. As much as a petabyte (million gigabytes, also referred to as $2^{50}$ bytes) of data may be stored for a group of organizations and their customers, in one embodiment.

An identity management object represents a user, or an application, or an access control list of permissions, and can represent additional objects that utilize authentication and authorization properties. Each identity management object is stored with a full set of properties and with an as-of time stamp, also referred to as the state of the identity management object. Object properties can include, but are not limited to, user ID, roles and permissions, in one example. Permissions can be stored as a separate object, which also can change over time.

Identity Governance and Administration (IGA) 154, 254 use cases involve multiple entities such as users' access to accounts in various applications, where each entity has its own time stamp. Often, these accounts have permissions within that application. In addition to application-specific accounts and permissions, users also possess enterprise roles, which are functional roles that provide user access to a number of applications and specific permission in the application that applies to their functional role. For example, a financial analyst in the sales operations team may be provided access to sales forecasts in a CRM application, in addition to permission for viewing income statement details from past quarters.

Mutations, in this context, can be described as changes that occur for an identity management object with respect to time: create, update and delete. Each mutation gets stored with the set of properties in identity management object fields and with an as-of time stamp. In one example, the set of properties for an identity management object may be covered via twenty fields. Entity mutations for a specific identity management object can be joined at the time of mutation. Common objects are joined at the time of mutation to support the most commonly queried data, though time machine 195 does not require joining data at mutation time. At any point in the future, the analyst can query the time machine for an object as-of a certain date and then construct the relationships as they existed at that time.

EPS search engine 345 supports all mutations as inserts into the database. As a result, a user, application and entitlement update can each be stored as a new identity time machine record in data store 364. This enables the possession of each state of any object sent to EPS search engine 345 and the actual time the state happened. Time machine 195 queries on common object types may require no additional work on part of the analyst, because the identity management objects have been pre-joined, as described above. Queries over fields in multiple types of identity management objects can be accelerated via pre-calculation of a join over the fields. Additionally, the analyst can examine relationships between various objects that are not pre-joined, at any later point of time.

In order to perform analysis, the analyst can query the time machine for objects of the object type at a point-in-time and then perform joins of those identity management objects returned as responsive objects to the query, using data processing technologies such as Apache Spark. The post-query joins can be stored, updating time machine 195 with the new join object type. Once the results of the join are stored in time machine 195, the analyst can perform queries for relationships at the previously requested point of time. Apache Spark is an open-source unified analytics engine for large-scale data processing. A different analytics engine can be used in another embodiment of the disclosed technology.

One common relationship query is to determine the access that a user had at a certain point in time. Access can be of three types: (a) application access (captured by the account object), (b) entitlement access (a permission that an account has), and (c) functional role access (a collection of account and entitlement access). To capture this relationship, IGA 154 creates the assignments join each time there is an object mutation.

Figure 4:
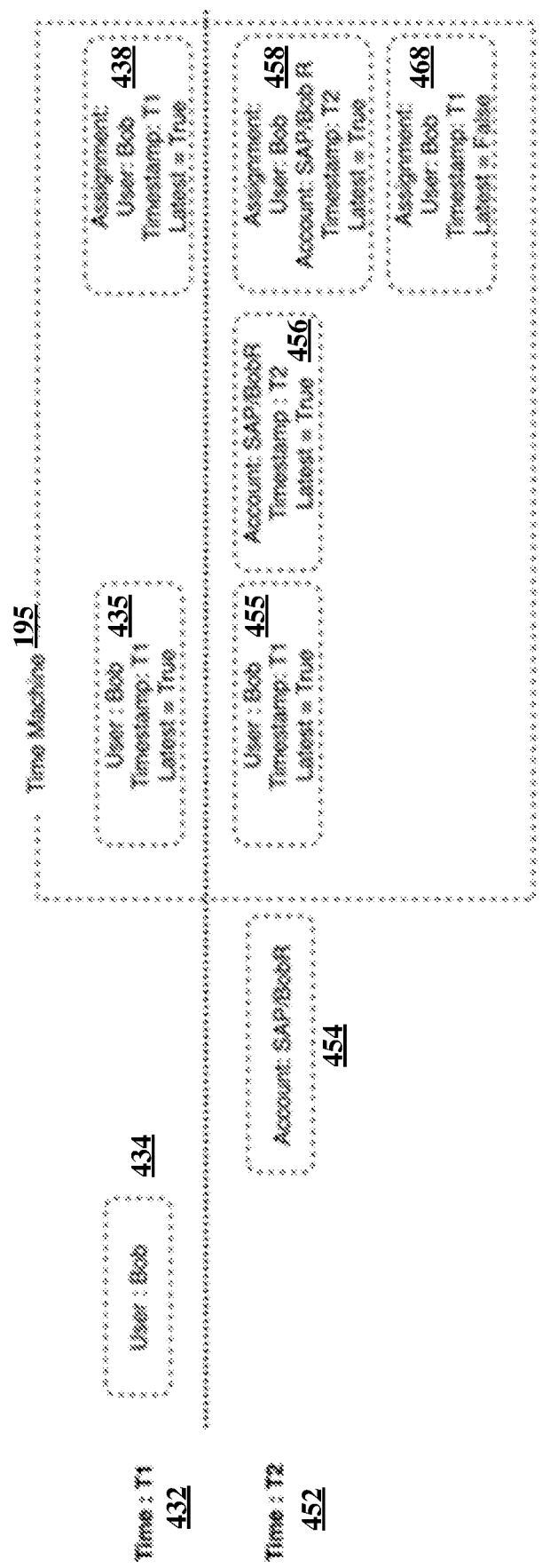
FIG. 4 and FIG. 5 illustrate access relationships captured in the disclosed time machine, with identity governance and administration pre joining users, accounts, entitlements, applications and enterprise roles at the time of mutation.
Figure 5:
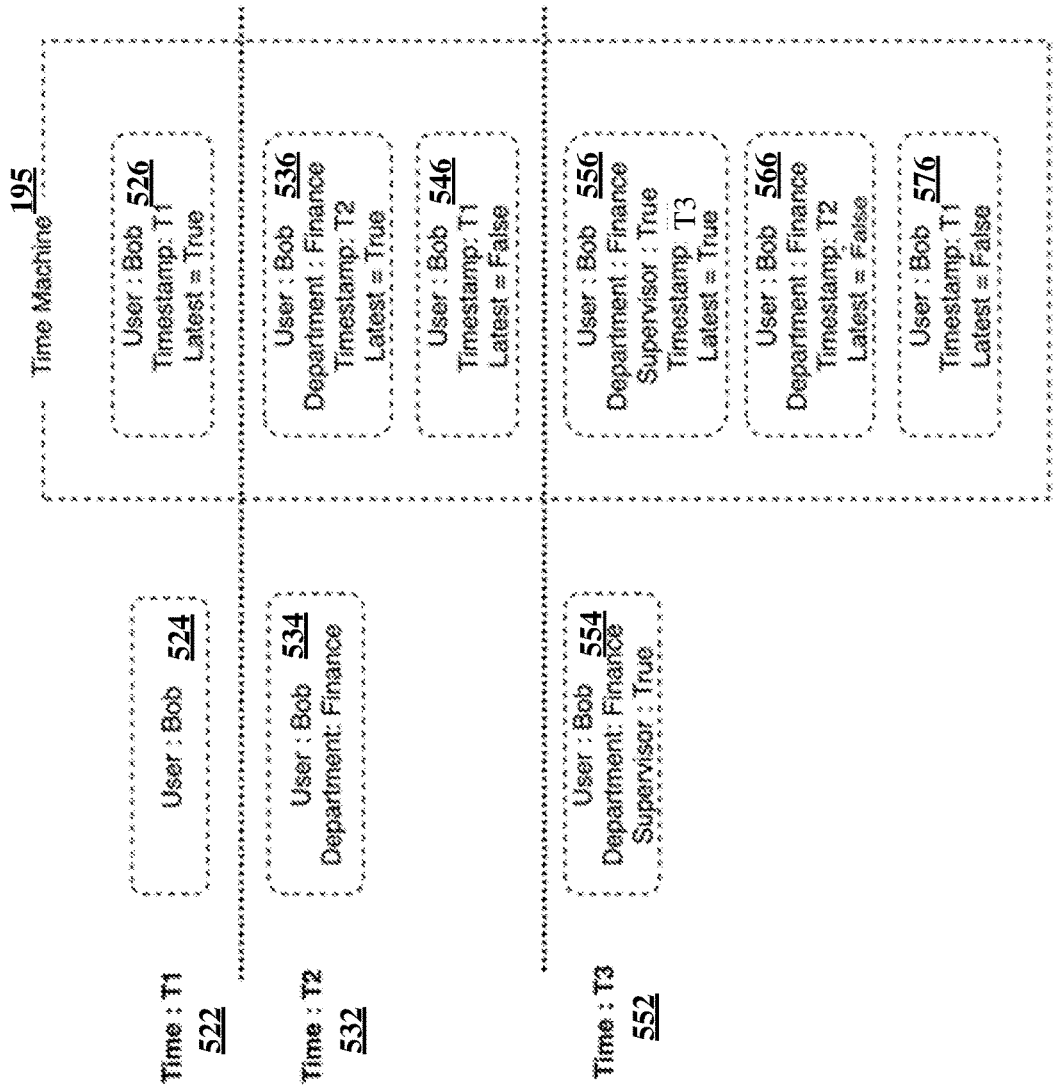

FIG. 4 and FIG. 5 illustrate access relationships captured in time machine 195, with identity governance and administration 154 pre-joining users, accounts, entitlements, applications and enterprise roles at the time of mutation. When one of the objects involved in the join changes, the old entries in the join that no longer apply still remain in time machine 195, and are marked as old, and new information gets added to the join table with the as-of time stamp of the last updated object within the join.

FIG. 4 shows an example of entries stored for two times T1 434 and T2 454 for user Bob and Bob's account access.

When a user Bob 434 is added, the assignment join has the user object with no accounts. The timestamp of the Bob assignment object 438 is the same as the timestamp of the Bob user object 435. When a user is given an account within an application 454, the account object 456 is added to the time machine. An account typically includes an identity footprint and its own metadata, such as within a mainframe within the SAP system, within the ERP, with an active directory, and this data can be stored in the fields of the identity management object for the account. At the same time the account object is added to time machine 195, a new entity is added to the assignment join that captures the user's relation to the account 458. The new entry in the assignment object is marked as the latest, with "Latest=True". As a result, all queries that request the user's current access see the new account. Any queries that used an older date, when the user did not have account access choose the older assignment object 468 (due to the previously captured as-of time stamp).

FIG. 5 shows another example of relationship entries stored for user Bob, this time for three times T1 522, T2 532, and T3 552, with a department account and an entitlement added at times after user Bob is created in the system. When the event management object for the creation of user Bob 524 is added to time machine, the timestamp of the Bob user is as-of time stamp T1 and the "latest" flag is set to true 526. When user Bob is given an account (department) 534, the user Bob object 536 is added to time machine 195 at as-of timestamp T2 and at the same time, a new entity is added to the join that captures the user's department 536. The new entry in the identity management object is marked as the latest, with "Latest=True" and earlier-in-time entries get updated to latest="false". As a result, all queries that request the user's current access see the new department. Any queries that used an older date, when the user did not have a department assigned, choose the older assignment object 546 (due to the previous captured as-of time stamp).

Continuing the description of FIG. 5, when user Bob is given an entitlement of supervisor within the finance department 554 at time T3 552, the entitlement identity management object is added to time machine 195. Given that entitlement is a common object, IGA joins the user Bob, department (finance) and entitlement (supervisor) to create a new object 556. This new entitlement object does not invalidate the join that involves just the department 566. As a result, the latest document describes the user's access to the finance department and captures the user "supervisor" entitlement in the department 556 at time T3. A query for the user's current access will return the access entry that is flagged as "latest=true" 556. A query for user Bob's access in the past, before the entitlement was added, will return only the access the user had at that time. In this example, that time may be one of several times: (a) when the user did not exist, (b) the user existed but did not have any accounts 576, (c) the user has a department account but does not yet have an entitlement 566, or (d) when the user has both the department account and the supervisor entitlement 556.

Next we describe several categories of use cases that utilize identity governance administration to examine state of identity management objects at an arbitrary prior time.

Use Cases

In one use case, an analyst can view details of various identity management objects now and for any time in the past. For one example, the user's profile specifies that only people with a certain job code and organization are expected to get a certain access. The analyst can query to learn whether both the job code and organization are satisfied as true for the user at the time when access was granted. Additionally, for this example in which only supervisors are specified to have the ability to approve a certain access, the analyst can query to determine whether the specific user was a supervisor of the other user who got the access at the time access was granted. In another example, for the Enterprise role and its composition, a specific finance department role has grown complex over time. The analyst can query to learn what access was conferred by the role just before the most recent significant change in the department's role. In a third example that considers applications and entitlements, the analyst can view what applications existed when a certain audit happened. Additionally, for a particular complex application that has evolved over time, the analyst is able to view what entitlements were available within the application when the application was first on-boarded.

In a second use case, an analyst wants to examine details of relations that each object had with other objects now and any time in the past. In one example, the analyst can query a user's access to applications, entitlements and enterprise roles at any time. In another example, an internal controls team has flagged few access rights to a specific person as problematic. The analyst can query to view the user's access grant history and can review the user profile at a given point in time and also the relationships the user had with other objects and the referenced objects' state at that time. In a third example, the analyst can view access decision history including access request approvals, access certification, segregation of duties exceptions and provisioning decisions, including reviewing the historic decisions that pertain to a certain access.

In a third use case, an analyst can request and receive a report of analytics on identity and access, now or for any time in the past. In one example, the query can access statistics and aggregations across a user's departments, job codes, titles, organizations, now and at any time in the past. The report can also show the breakdown and statistics of access by department, job codes, locations or any other user defined criteria. The analyst can also query for certification, access request and separation of duties analytics at various points in time, for answering questions such as "How many certifications were done in a certain quarter?", or "What is the breakdown of access requests from a specific department for a specific high risk entitlement last year?"

In a fourth use case, an administrator wants to restore a system to a known good state. In this example, the last application synchronization contained bad data, causing a lot of access to be removed from legitimate users. A query by the administrator can be used to determine what was the specific access landscape was just before the synchronization time event, so that it can be used to restore the system to a known good state.

FIG. 6 lists a query example that illustrates a single-entity time-based query, usable for explaining how the disclosed system for examining the state of identity management objects at an arbitrary prior time works. In this example, there are two user objects: one that belongs to a user "Sudhakar" and another that belongs to user "Jamie". As the Sudhakar object mutates, the time machine simply accumulates full objects for Sudhakar with its time stamp of mutation. Five mutations to the Sudhakar object are captured, as listed, corresponding to the March 612, April 632, May 652, June 662 and July 672 mutation timestamps, all in 2020. There is one user object for Jamie with a timestamp of May 2010 616. Based on this data, an API or UI can perform queries on users to learn the state of the user objects as of a certain date. In the example 636, time machine 195 is queried for latest user objects as of Jun. 3, 2020.

Figure 7:
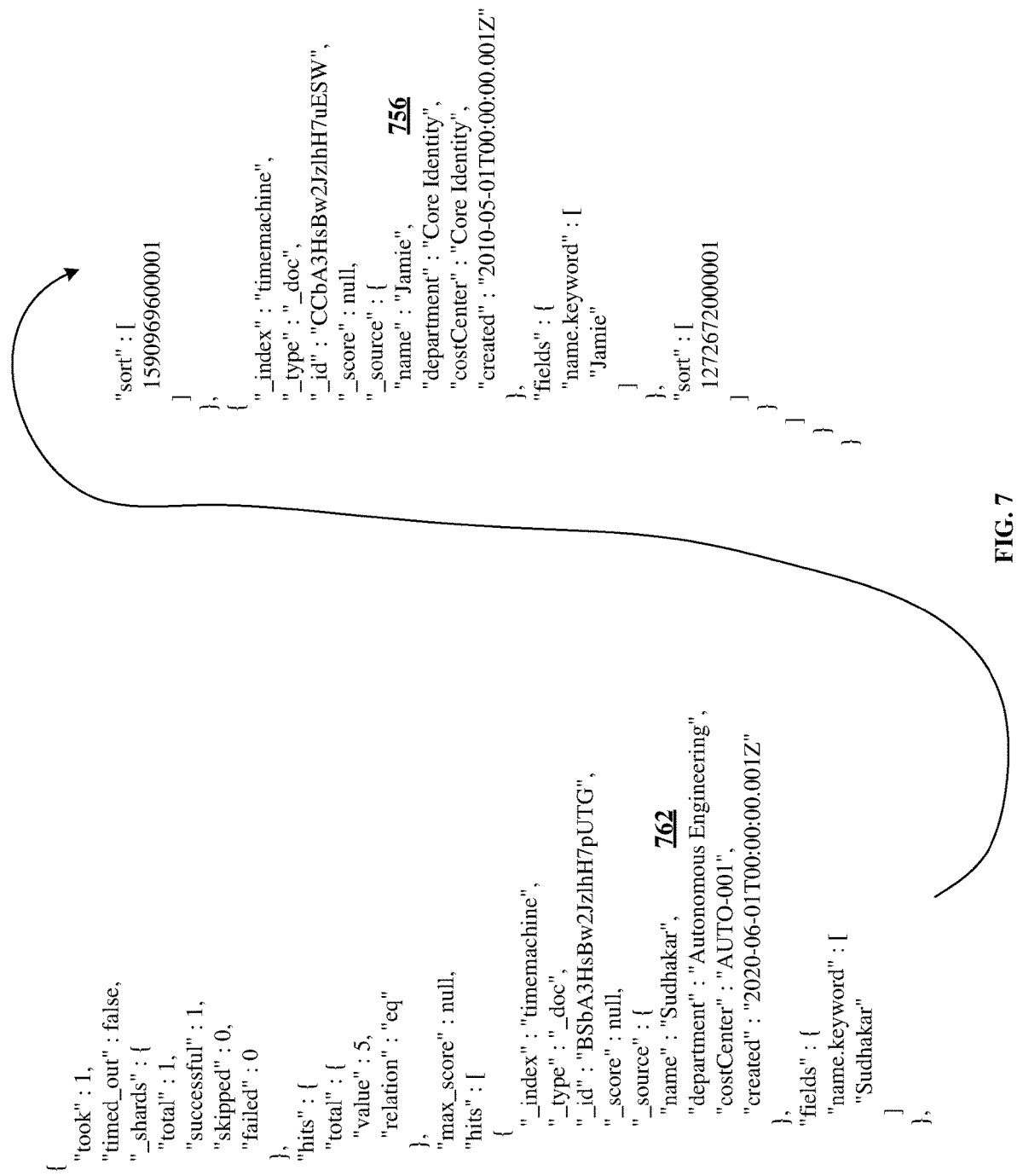
FIG. 7 illustrates the general principle for examining the state of identity management objects at an arbitrary prior time.

FIG. 7 illustrates the general principle for examining the state of identity management objects at an arbitrary prior time. This principle is also utilized across complex queries involving relationships between various objects and their timestamps. FIG. 7 lists the results of the query, which returns the June 2020 state of the "Sudhakar" objects 762 and the May 2010 state of the "Jamie" object 756.

Workflow

Figure 8:
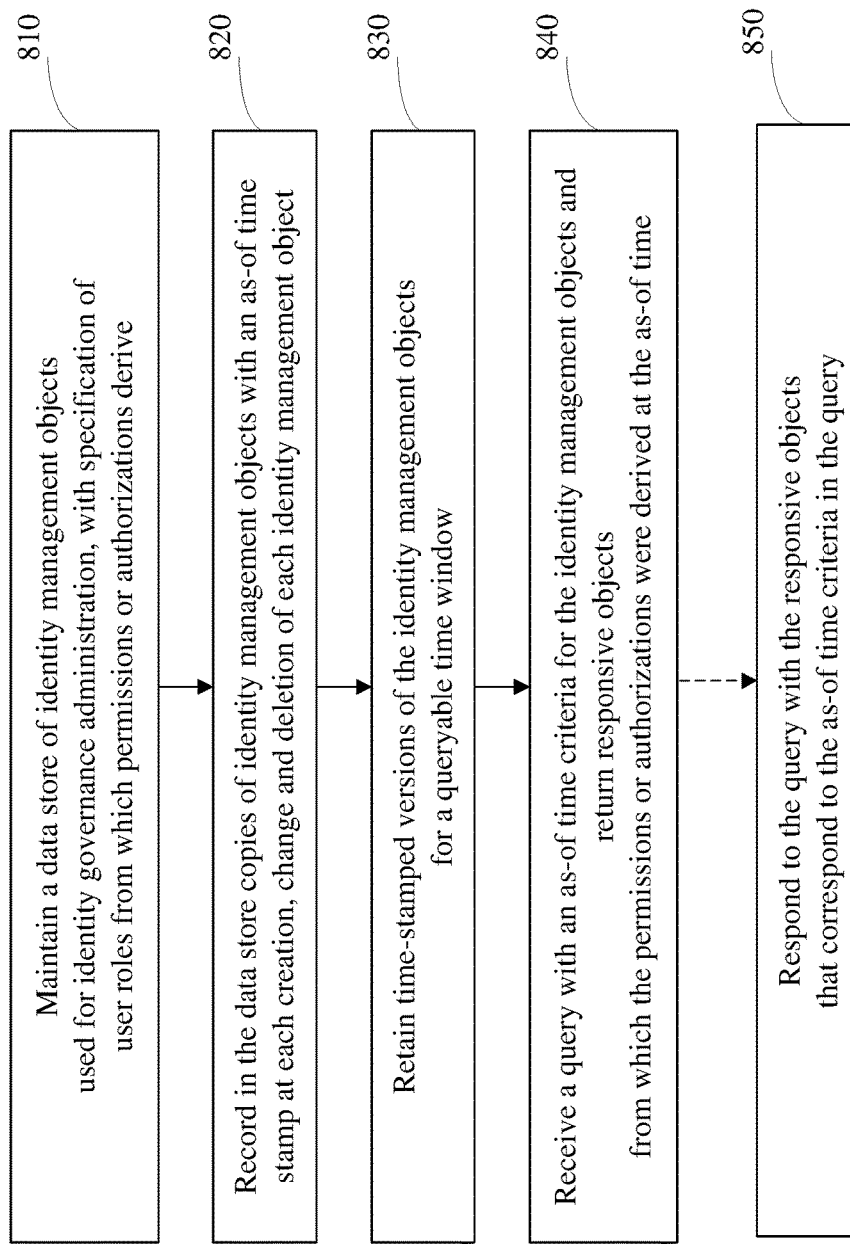
FIG. 8 shows a representative workflow for enabling identity governance administration to examine state of identity management objects at an arbitrary prior time.

FIG. 8 shows a representative method of enabling identity governance administration to examine state of identity management objects at an arbitrary prior time. Other implementations may perform the actions in different orders and/or with different, fewer or additional actions than those illustrated in FIG. 8. Multiple actions can be combined in some implementations.

FIG. 8 begins with action 810 maintaining a data store of identity management objects used for identity governance administration, including specification of user roles from which permissions or authorizations derive.

Process 800 continues at action 820 with recording in the data store copies of identity management objects with an as-of time stamp at each creation, change and deletion of each identity management object.

Action 830 includes retaining time-stamped versions of the identity management objects for a queryable time window.

Action 840 includes receiving a query with an as-of time criteria for at least some of the identity management objects and returning responsive objects from which the permissions or authorizations were derived at the as-of time.

Action 850 includes optionally responding to the query with the responsive objects that correspond to the as-of time criteria in the query.

Next we describe a computer system that can be used for enabling identity governance administration to examine the state of identity management objects.

Computer System

Figure 9:
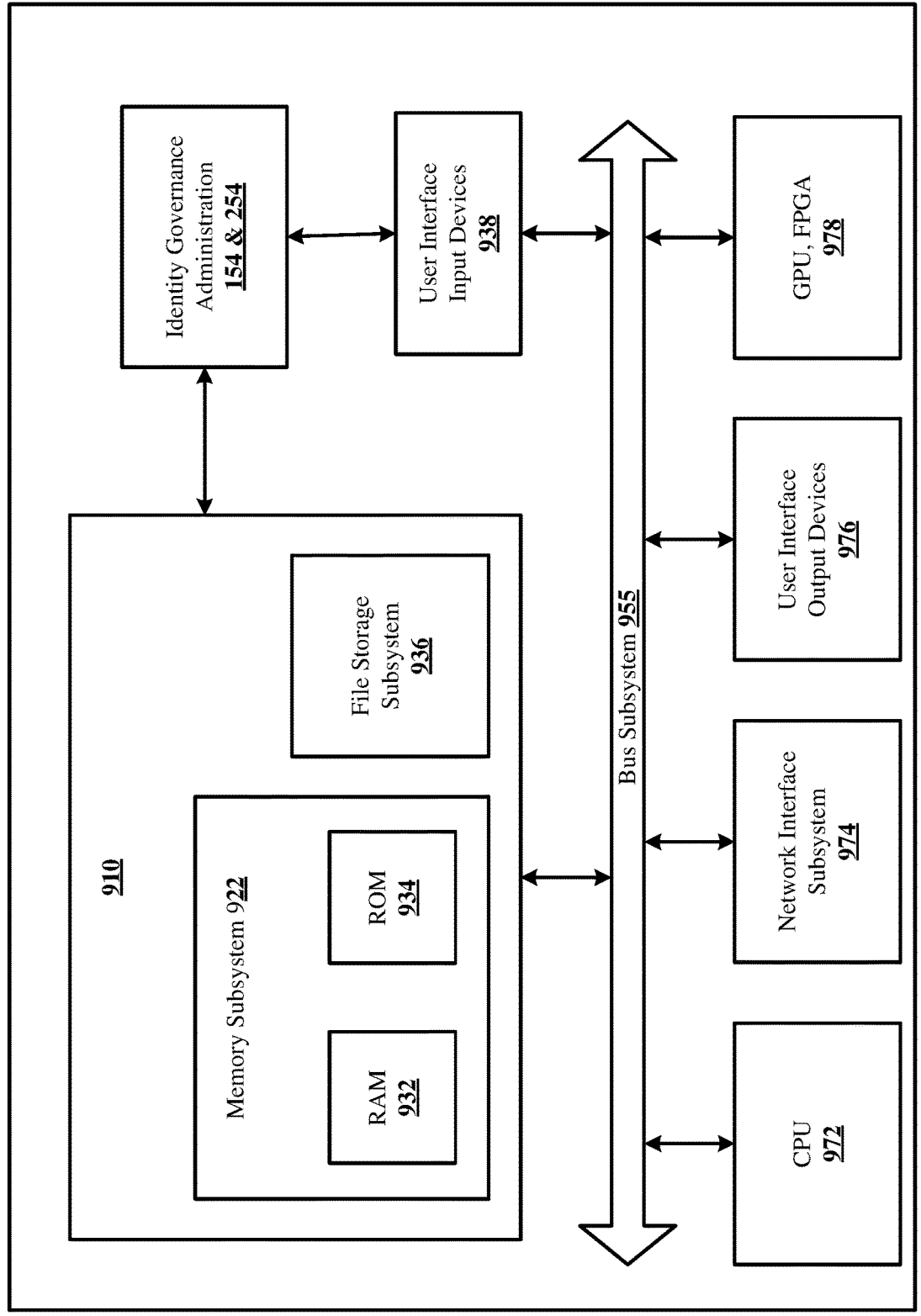
FIG. 9 is a simplified block diagram of a computer system that can be used for enabling identity governance administration to examine the state of identity management objects at any arbitrary prior time, according to one embodiment of the disclosed technology.

FIG. 9 is a simplified block diagram of a computer system 900 that can be used for enabling identity governance administration to examine the state of identity management objects at an arbitrary prior time. Computer system 900 includes at least one central processing unit (CPU) 972 that communicates with a number of peripheral devices via bus subsystem 955, and identity governance administration 154, which in one implementation provides the services described herein. These peripheral devices can include a storage subsystem 910 including, for example, memory devices and a file storage subsystem 936, user interface input devices 938, user interface output devices 976, and a network interface subsystem 974. The input and output devices allow user interaction with computer system 900. Network interface subsystem 974 provides an interface to outside networks, including an interface to corresponding interface devices in other computer systems. In one implementation, identity governance administration 154 of FIG. 1 is communicably linked to the storage subsystem 910 and the user interface input devices 938. For a different implementation, identity governance administration 154 of FIG. 2 can be communicably linked to the storage subsystem 910 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices.

In general, use of the term "input device" is intended to include all possible types of devices and ways to input information into computer system 900.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. Subsystem 978 can be graphics processing units (GPUs) or field-programmable gate arrays (FPGAs).

Memory subsystem 922 used in the storage subsystem 910 can include a number of memories including a main random-access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 910, or in other machines accessible by the processor.

Bus subsystem 955 provides a mechanism for letting the various components and subsystems of computer system 900 communicate with each other as intended. Although bus subsystem 955 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or fewer components than the computer system depicted in FIG. 9.

Particular Implementations

Some implementations and features for enabling identity governance administration to examine the state of identity management objects at an arbitrary prior time, implemented on a cloud-based computing service are described in the following discussion.

One implementation discloses a computer-implemented method of enabling identity governance administration to examine the state of identity management objects at an arbitrary prior time includes maintaining a data store of identity management objects used for identity governance administration, including specification of user roles from which permissions or authorizations derive, and recording in the data store copies of identity management objects with an as-of time stamp at each creation, change and deletion of each identity management object. The disclosed method also includes retaining time-stamped versions of the identity management objects for a queryable time window and receiving a query with an as-of time criteria for at least some of the identity management objects from which the permissions or authorizations were derived at the as-of time. In some cases, the full set of time-stamped version of the identity management objects are maintained in the data store.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Some implementations of a disclosed computer-implemented method further include responding to the query with the responsive objects that correspond to the as-of time criteria in the query.

Some implementations of the disclosed method also include in the data store pre-joined identity management objects, whereby queries over fields in multiple types of identity management objects are accelerated by pre-calculation of a join over the fields. The disclosed pre-joined identity management object includes one of user, account, entitlement, application and role, and can also be additional agreed-upon objects.

Many implementations of the disclosed method include joining identity management objects retrieved in response to the query.

For the disclosed implementations, the recording in a data store utilizes a cloud-based computing service which is one of Google Cloud Platform (GCP), Amazon Web Services (AWS) or Microsoft Azure Virtual Platform. Another service provider could be utilized as well.

Some implementations of the disclosed method further include applying analytics to the identity management objects returned.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Some implementations of the disclosed method further include

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A computer-implemented method of enabling identity governance administration to examine state of identity management objects at an arbitrary prior time, including:
   maintaining a data store of identity management objects used for identity governance administration that are stored separately from data defining a respective user, account, entitlement, application, or role to which each respective identity management object pertains, including specification of user roles from which permissions or authorizations derive;
   recording, in the data store, copies of identity management objects with an as-of time stamp at each creation, change and deletion of each identity management object;
   retaining time-stamped versions of the identity management objects for a queryable time window; and
   receiving a query with an as-of time criteria with an as-of time for at least some of the identity management objects and returning responsive identity management objects from which the permissions or authorizations were derived at the as-of time.

2. The computer-implemented method of claim 1, further including responding to the query with the responsive identity management objects that correspond to the as-of time criteria in the query.

3. The computer-implemented method of claim 1, further including in the data store pre-joined identity management objects, whereby queries over fields in multiple types of identity management objects are accelerated by pre-calculation of a join over the fields.

4. The computer-implemented method of claim 3, wherein the pre-joined identity management objects include one of user, account, entitlement, application and role.

5. The computer-implemented method of claim 1, further including joining identity management objects retrieved in response to the query.

6. The computer-implemented method of claim 1, wherein the recording in the data store utilizes a cloud-based computing service which is one of Google Cloud Platform (abbreviated GCP), Amazon Web Services (abbreviated AWS) or Microsoft Azure Virtual Platform.

7. The computer-implemented method of claim 1, further including applying analytics to the identity management objects returned.

8. A tangible non-transitory computer readable storage media, including program instructions loaded into memory that, when executed on one or more processors, cause the one or more processors to implement a method of enabling identity governance administration to examine state of identity management objects at an arbitrary prior time, including:
   maintaining a data store of identity management objects used for identity governance administration that are stored separately from data defining a respective user, account, entitlement, application, or role to which each respective identity management object pertains, including specification of user roles from which permissions or authorizations derive;
   recording, in the data store, copies of identity management objects with an as-of time stamp at each creation, change and deletion of each identity management object;
   retaining time-stamped versions of the identity management objects for a queryable time window; and
   receiving a query with an as-of time criteria with an as-of time for at least some of the identity management objects and returning responsive identity management objects from which the permissions or authorizations were derived at the as-of time.

9. The tangible non-transitory computer readable storage media of claim 8, further including responding to the query with the responsive identity management objects that correspond to the as-of time criteria in the query.

10. The tangible non-transitory computer readable storage media of claim 8, further including in the data store pre-joined identity management objects, whereby queries over fields in multiple types of identity management objects are accelerated by pre-calculation of a join over the fields.

11. The tangible non-transitory computer readable storage media of claim 10, wherein the pre-joined identity management objects include one of user, account, entitlement, application and role.

12. The tangible non-transitory computer readable storage media of claim 8, further including joining identity management objects retrieved in response to the query.

13. The tangible non-transitory computer readable storage media of claim 8, wherein the recording in the data store utilizes a cloud-based computing service which is one of Google Cloud Platform (abbreviated GCP), Amazon Web Services (abbreviated AWS) or Microsoft Azure Virtual Platform.

14. The tangible non-transitory computer readable storage media of claim 8, further including applying analytics to the identity management objects returned.

15. A system for enabling identity governance administration to examine state of identity management objects at an arbitrary prior time, the system including a processor, memory coupled to the processor and computer instructions from the tangible non-transitory computer readable storage media of claim 8 loaded into the memory.

16. The system of claim 15, further including responding to the query with the responsive identity management objects that correspond to the as-of time criteria in the query.

17. The system of claim 15, further including in the data store pre-joined identity management objects, whereby queries over fields in multiple types of identity management objects are accelerated by pre-calculation of a join over the fields.

18. The system of claim 17, wherein the pre-joined identity management objects include one of user, account, entitlement, application and role.

19. The system of claim 15, further including joining identity management objects retrieved in response to the query.

20. The system of claim 15, wherein the recording in the data store utilizes a cloud-based computing service which is one of Google Cloud Platform (abbreviated GCP), Amazon Web Services (abbreviated AWS) or Microsoft Azure Virtual Platform.

21. The system of claim 15, further including applying analytics to the identity management objects returned.

* * * * *